US010349490B2

(12) United States Patent
Sato

(10) Patent No.: US 10,349,490 B2
(45) Date of Patent: Jul. 9, 2019

(54) ILLUMINATION DEVICE

(71) Applicant: BALMUDA INC., Musashino-shi, Tokyo (JP)

(72) Inventor: Tomoki Sato, Musashino (JP)

(73) Assignee: BALMUDA INC., Musahino-shi (JP)

( * ) Notice: Subject to any disclaimer, the term of this patent is extended or adjusted under 35 U.S.C. 154(b) by 110 days.

(21) Appl. No.: 15/540,501

(22) PCT Filed: Jan. 20, 2016

(86) PCT No.: PCT/JP2016/051557
§ 371 (c)(1),
(2) Date: Jun. 28, 2017

(87) PCT Pub. No.: WO2016/117593
PCT Pub. Date: Jul. 28, 2016

(65) Prior Publication Data
US 2017/0332460 A1 Nov. 16, 2017

(30) Foreign Application Priority Data
Jan. 20, 2015 (JP) ................................ 2015-008841

(51) Int. Cl.
*F21S 6/00* (2006.01)
*F21S 8/00* (2006.01)
(Continued)

(52) U.S. Cl.
CPC .......... *H05B 37/0227* (2013.01); *F21S 6/003* (2013.01); *F21S 8/03* (2013.01);
(Continued)

(58) Field of Classification Search
None
See application file for complete search history.

(56) References Cited

U.S. PATENT DOCUMENTS

| 2008/0181467 | A1* | 7/2008 | Zappia | ............... | G06K 9/00604 |
| | | | | | 382/117 |
| 2014/0001964 | A1* | 1/2014 | Ono | ................... | H05B 37/0209 |
| | | | | | 315/153 |

FOREIGN PATENT DOCUMENTS

| CN | 201672365 U | 12/2010 |
| CN | 103 423 657 A | 12/2013 |

(Continued)

OTHER PUBLICATIONS

Apr. 12, 2016 International Search Report issued in International Patent Application No. PCT/JP2016/051557.
(Continued)

*Primary Examiner* — Idowu O Osifade
(74) *Attorney, Agent, or Firm* — Oliff PLC

(57) ABSTRACT

Illumination device maintains distance between eyes of user and object, and lights up desktop with appropriate illuminance. Illumination device includes light source for lighting up desktop, arm mechanism incorporates motor for moving position of light source, face camera detects position of eyes of user, desk cameras detects illuminance distribution on desk, image processing part calculates posture of user and distance between eyes of user and desk, based on face images obtained with face camera and desk images obtained with desk cameras, computation part calculates optimal light source position of light source wherein dispersion of illuminance distribution on desk is minimized, based on posture of user derived with image processing part and illuminance distribution obtained with desk camera, warning part that generates warning, in cases where distance is less than or equal to predetermined value, and control part operates arm mechanism such that light source moves to optimal light source position.

5 Claims, 10 Drawing Sheets

(51) Int. Cl.
    *G06K 9/00*     (2006.01)
    *G06T 7/73*     (2017.01)
    *H04R 1/02*     (2006.01)
    *F21V 14/02*     (2006.01)
    *F21V 17/02*     (2006.01)
    *F21V 21/15*     (2006.01)
    *F21V 21/28*     (2006.01)
    *F21V 23/04*     (2006.01)
    *G08B 21/04*     (2006.01)
    *G08B 21/18*     (2006.01)
    *H05B 37/02*     (2006.01)

(52) U.S. Cl.
    CPC .............. *F21V 14/02* (2013.01); *F21V 17/02* (2013.01); *F21V 21/15* (2013.01); *F21V 21/28* (2013.01); *F21V 23/0478* (2013.01); *G06K 9/00362* (2013.01); *G06T 7/74* (2017.01); *G08B 21/0461* (2013.01); *G08B 21/182* (2013.01); *H04R 1/028* (2013.01); *H05B 37/02* (2013.01); *G06K 9/00255* (2013.01); *G06K 9/00604* (2013.01); *G06T 2207/30201* (2013.01)

(56) References Cited

FOREIGN PATENT DOCUMENTS

| | | |
|---|---|---|
| CN | 103 488 980 A | 1/2014 |
| CN | 103 908 065 A | 7/2014 |
| CN | 104076927 A | 10/2014 |
| CN | 104 202 865 A | 12/2014 |
| CN | 204 083 971 U | 1/2015 |
| JP | H04-144002 A | 5/1992 |
| JP | H07-85977 A | 3/1995 |
| JP | 2005-259437 A | 9/2005 |
| JP | 2010-257753 A | 11/2010 |
| JP | 2013-125596 A | 6/2013 |
| JP | 2014-086311 A | 5/2014 |
| WO | 2010/146446 A1 | 12/2010 |

OTHER PUBLICATIONS

Nov. 21, 2018 Office Action issued in Chinese Patent Application No. 201680003257.X.
Jul. 30, 2018 Search Report issued in European Patent Application No. 18160367.1.
Jul. 30, 2018 Search Report issued in European Patent Application No. 16740200.7.

\* cited by examiner

ILLUMINATION DEVICE

TECHNICAL FIELD

The present invention relates to an illumination device, and more particularly to a device that appropriately maintains the posture of a user, and appropriately illuminates a desktop.

BACKGROUND ART

Illumination devices that are referred to as so-called desk lights are in general use (e.g., see Patent Literatures 1 to 3). With such illumination devices, a user moves the device as appropriate to adjust its position such that the desired position of the desk is provided with appropriate illuminance.

Various improvements have been made to such desk lights, and an illumination device in which motors are provided in movable portions that are for changing the illumination direction is known (e.g., see Patent Literature 1). Also, an illumination device that adjusts the color and controls the irradiation range to deal with the case where the focus adjustment function of the eyes declines with factors such as age and fatigue is known (e.g., see Patent Literature 2). Furthermore, an illumination device that adjusts the light after determining character size and whether the object being illuminated is color or monochrome is known (e.g., see Patent Literature 3).

CITATION LIST

Patent Literature

[PLT 1] JP 04-144002A
[PLT 2] JP 2013-125596A
[PLT 3] JP 2014-086311A

SUMMARY OF INVENTION

Technical Problem

The following problems exist with the abovementioned illumination devices. That is, the fact that the user takes various postures and these postures are ever-changing is not taken into consideration. The user's positional relationship with the desk and the light source also changes when he or she changes posture. Accordingly, there are times when the user's eyes remain close to an object on the desk such as book for an extended period when he or she is reading. This strains the ciliary muscle in the eyeball, and may lead to worsening eyesight. Also, when there are large differences in illuminance on the desktop, this places a load on the eyes, and may similarly lead to worsening eyesight. Furthermore, when the shadow of a writing implement or the user's hand falls on the book, this makes it difficult to read text or the like, and may similarly lead to worsening eyesight. Also, when the illuminance on the desktop is low, the user may move his or her eyes closer in an attempt to read the book or the like, shortening the distance between his or her eyes and the object as aforementioned, and possibly leading to worsening eyesight.

In view of this, an object of the present invention is to provide an illumination device that is able to appropriately maintain a distance between the user's eyes and an object, and to light up a desktop with appropriate illuminance.

Solution to Problem

In order to resolve the above problems and achieve the object, an illumination device of the present invention is configured as follows.

The illumination device includes a light source for lighting up a desktop, an arm mechanism incorporating a motor for moving a position of the light source, a user camera that detects a user, a desk camera that detects a situation on the desktop, an image processing part that calculates a posture of the user and a distance between a specific region of the user and the desk, based on a user image obtained with the user camera and a desk image obtained with the desk camera, a computation part that calculates, based on the posture of the user derived with the image processing part and the illuminance distribution obtained with the desk camera, an optimal light source position of the light source at which dispersion of the illuminance distribution is minimized, a warning part that generates a warning in a case where the distance is less than or equal to a predetermined value, and an arm control part that operates the arm mechanism such that the light source moves to the optimal light source position.

Advantageous Effects of Invention

According to the present invention, it becomes possible to appropriately maintain the distance between the user's eyes and an object, and to light up a desktop with appropriate illuminance.

DESCRIPTION OF EMBODIMENTS

Figure 1:
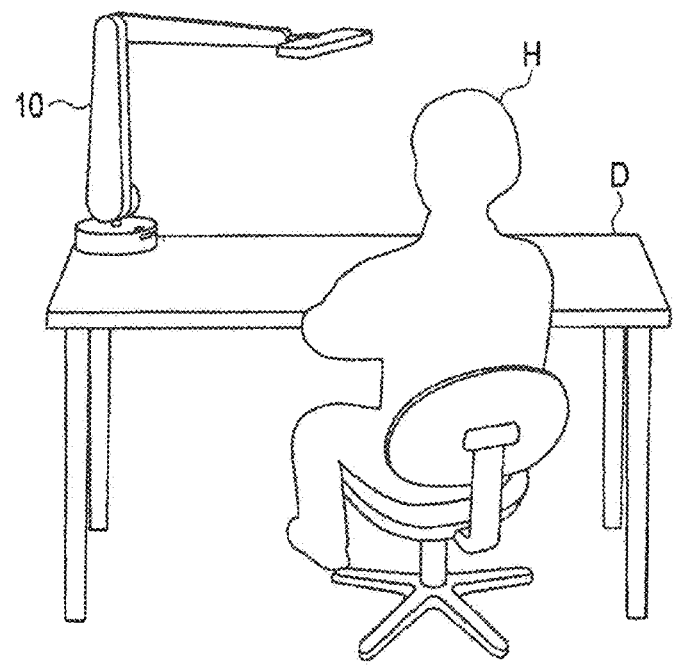
FIG. 1 is a perspective view showing an illumination device according to one embodiment of the present invention and a desk on which the illumination device is set.
Figure 2:
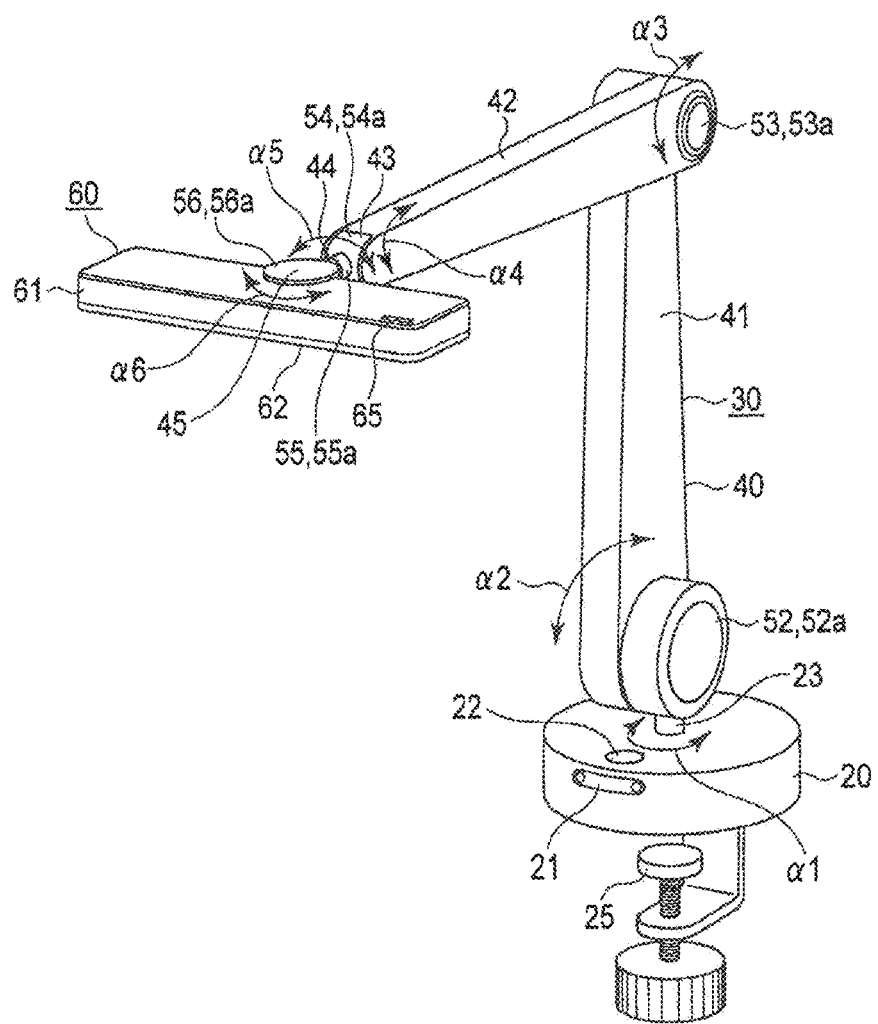
FIG. 2 is a perspective view showing the illumination device.
Figure 3:
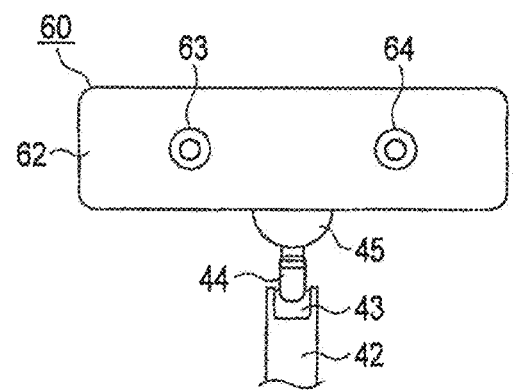
FIG. 3 is a bottom view showing a head part incorporated in the illumination device.
Figure 4:
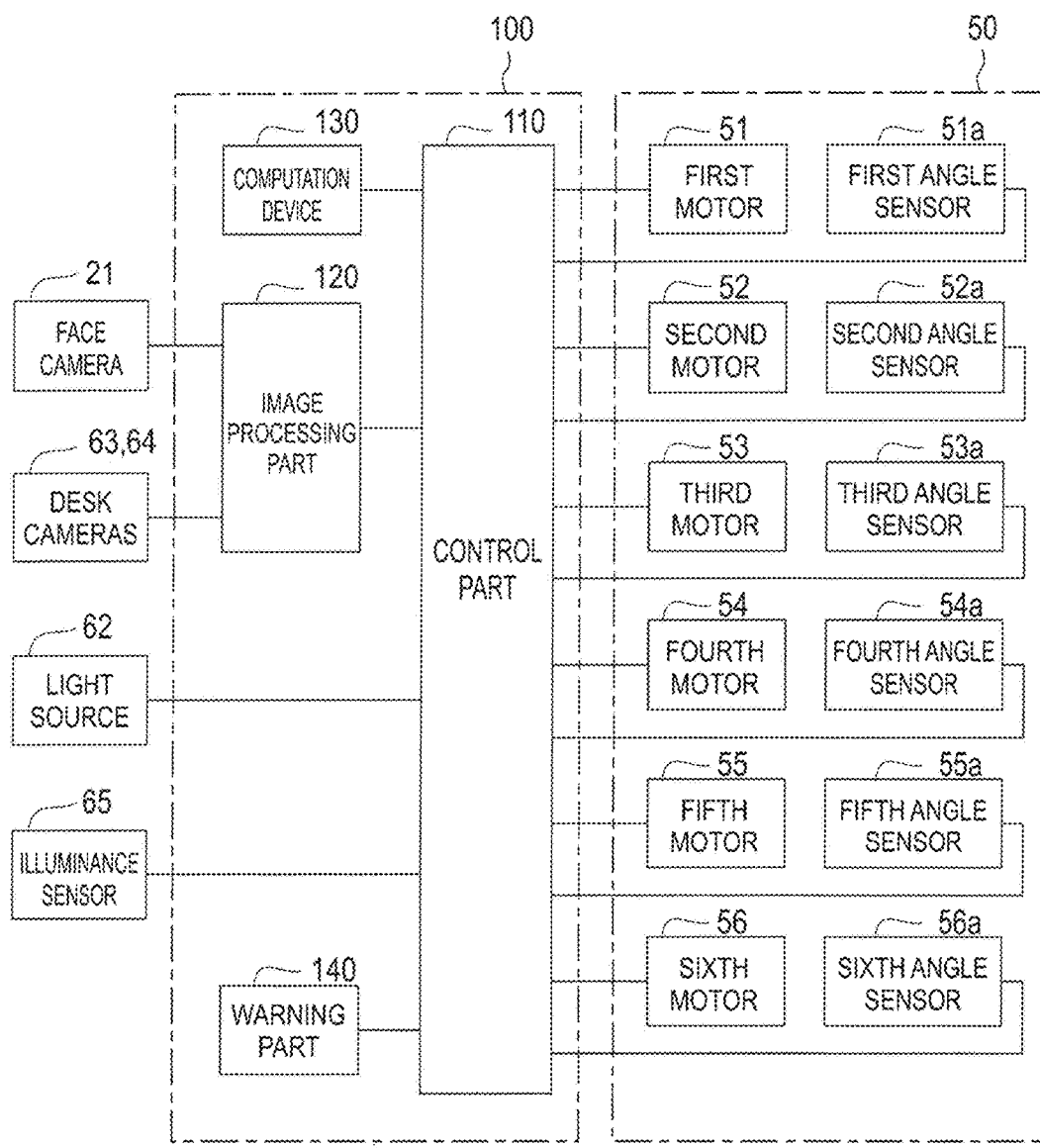
FIG. 4 is a schematic block diagram of the illumination device.
Figure 5:
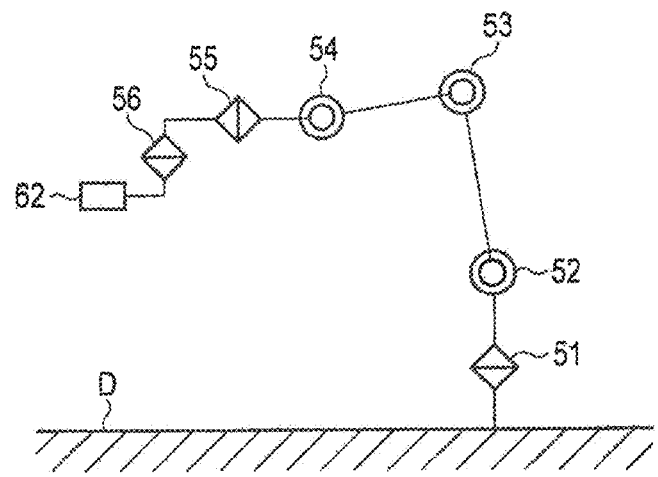
FIG. 5 is an explanatory diagram showing a mechanism model of an arm part incorporated in the illumination device.
Figure 6:
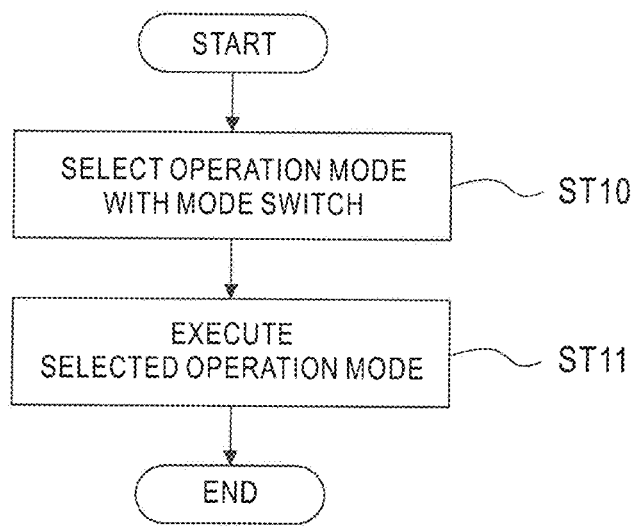
FIG. 6 is an explanatory diagram showing the basic operation flow of the illumination device.
Figure 7:
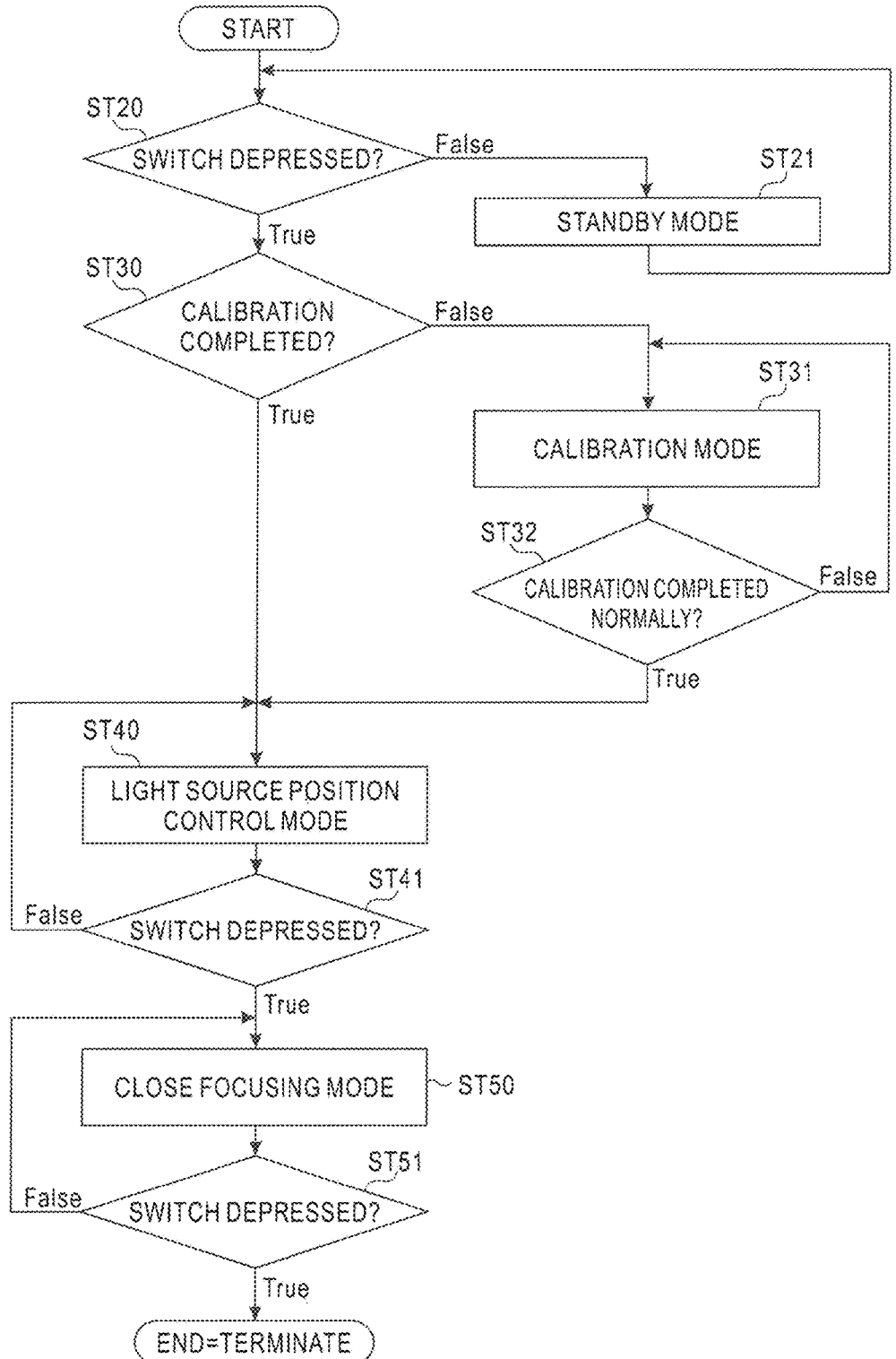
FIG. 7 is an explanatory diagram showing the operation flow of mode selection of the illumination device.
Figure 8:
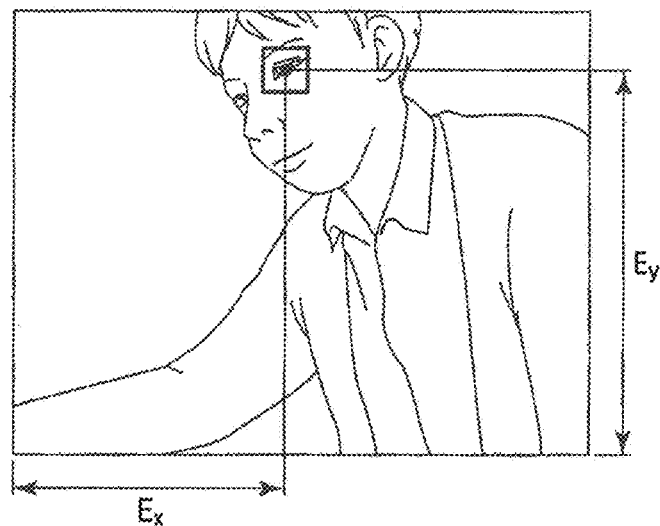
FIG. 8 is an explanatory diagram showing an operation for detecting the distance between the eyes and the desk by the illumination device.
Figure 9:
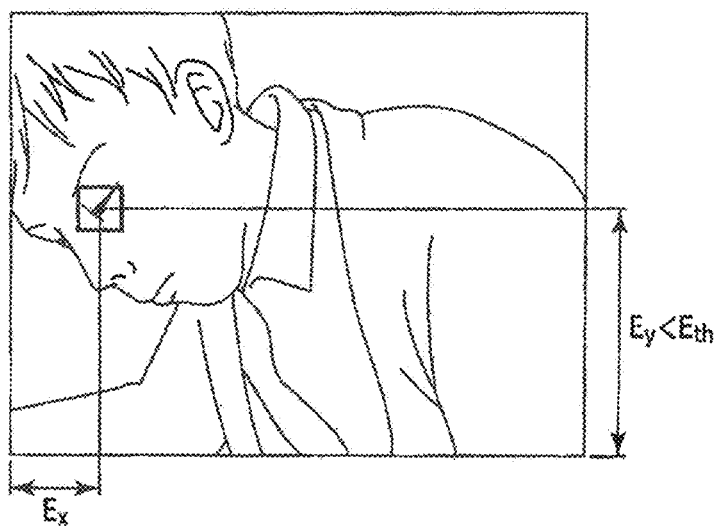
FIG. 9 is an explanatory diagram showing an operation for detecting the distance between the eyes and the desk by the illumination device.
Figure 10:
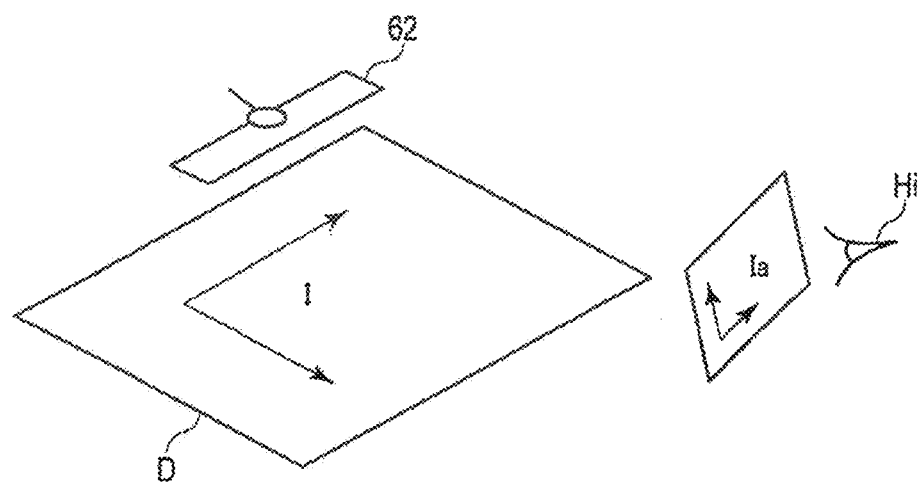
FIG. 10 is an explanatory diagram showing an illuminance distribution detection principle of the illumination device.
Figure 11:
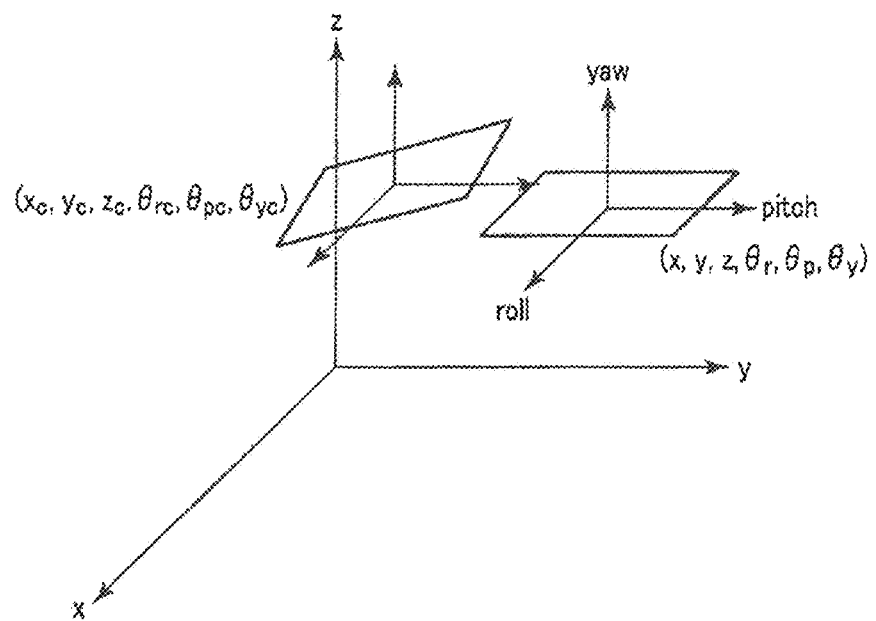
FIG. 11 is an explanatory diagram showing coordinate axes of light source positions of the illumination device.
Figure 12:
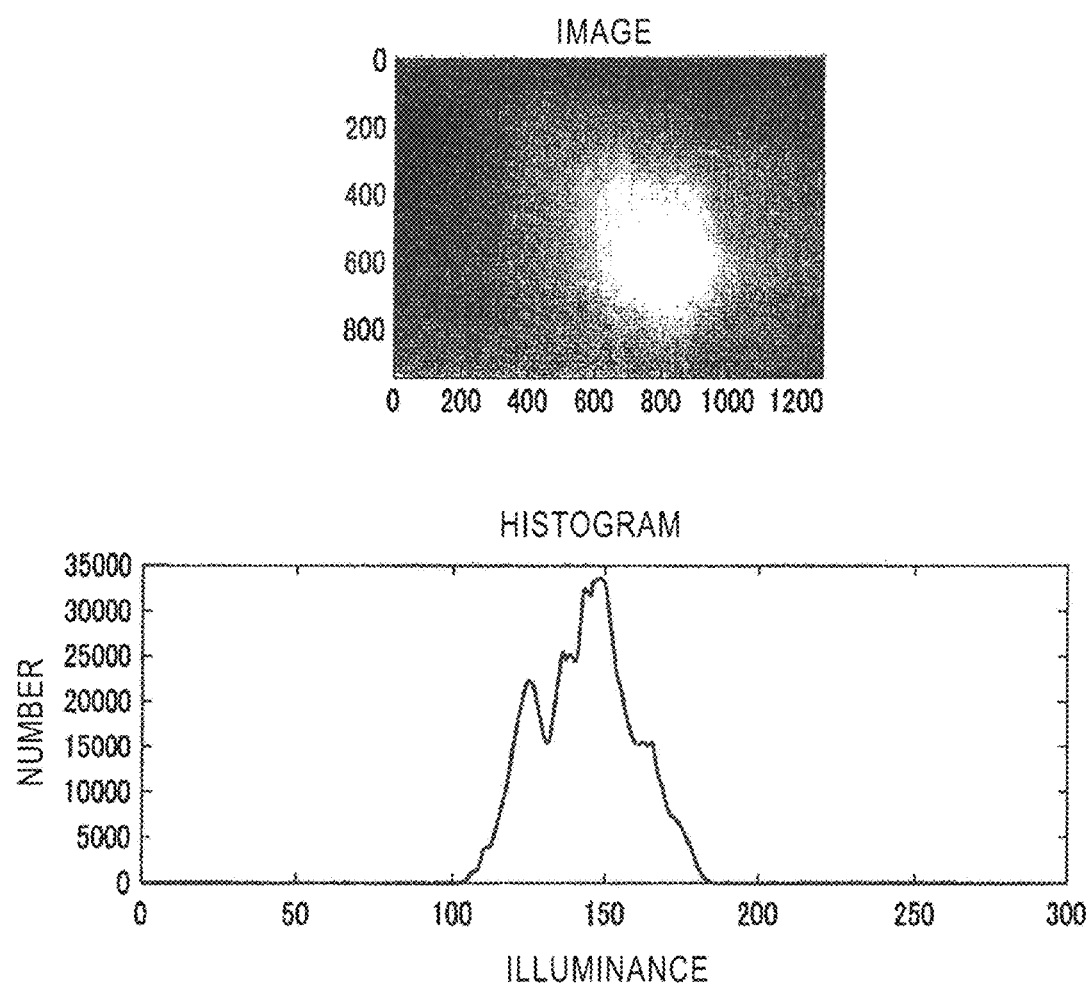
FIG. 12 is an explanatory diagram showing an image and an illuminance histogram before improvement in the illuminance distribution of the illumination device.
Figure 13:
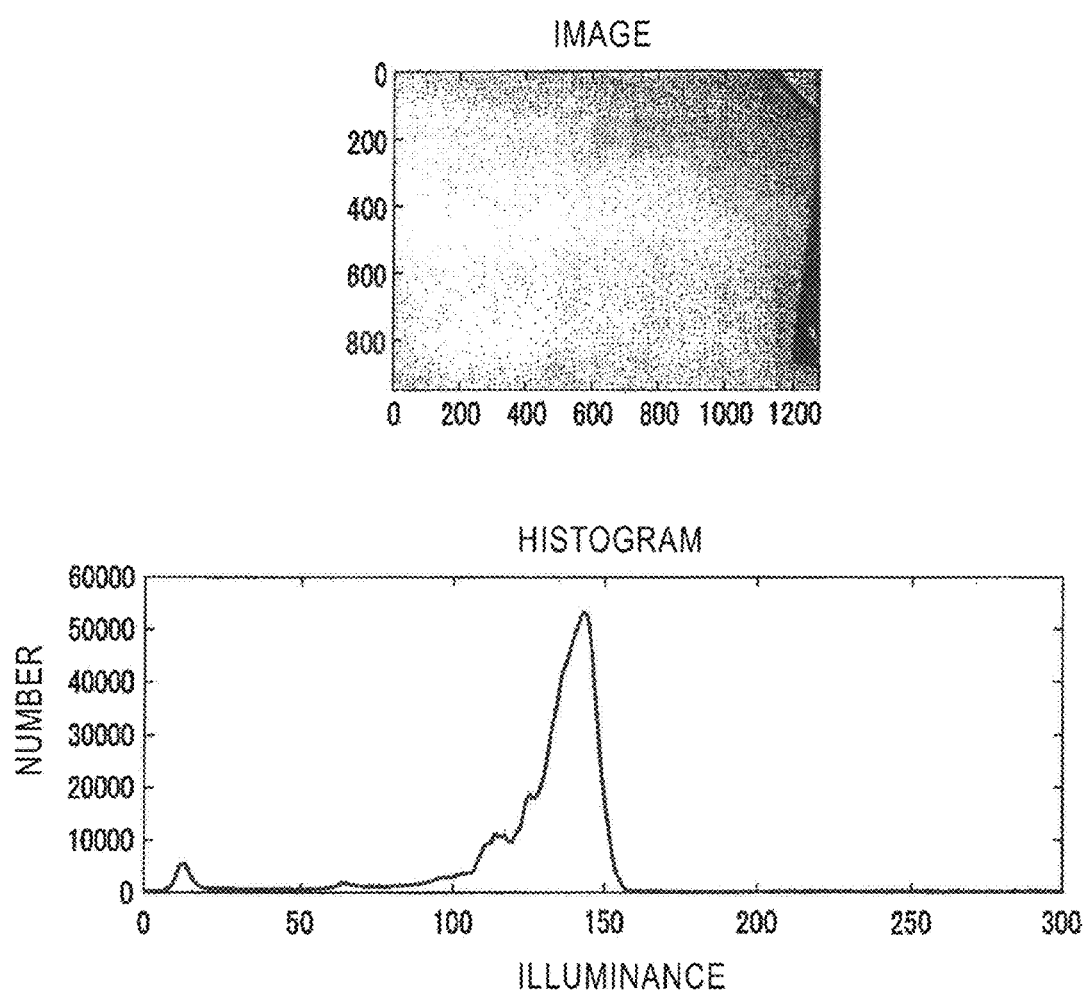
FIG. 13 is an explanatory diagram showing an image and an illuminance histogram after improvement in the illuminance distribution of the illumination device.

FIG. 1 is a perspective view showing an illumination device 10 according to one embodiment of the present invention and a desk D on which the illumination device 10 is set, FIG. 2 is a perspective view showing the illumination device 10, FIG. 3 is a bottom view showing a head part 60 incorporated in the illumination device 10, FIG. 4 is a schematic block diagram of the illumination device 10, FIG. 5 is an explanatory diagram showing a mechanism model of an arm part 40, FIG. 6 is an explanatory diagram showing the basic operation flow of the illumination device 10, FIG. 7 is an explanatory diagram showing the operation flow of mode selection of the illumination device 10, FIG. 8 is an explanatory diagram showing an operation for detecting the distance between the eyes and the desk by the illumination device 10, FIG. 9 is an explanatory diagram showing an operation for detecting the distance between the eyes and the desk by the illumination device 10, FIG. 10 is an explanatory diagram showing an illuminance distribution detection principle of the illumination device 10, FIG. 11 is an explanatory diagram showing coordinate axes of light source positions of the illumination device 10, FIG. 12 is an explanatory diagram showing an image and an illuminance histogram before improvement in the illuminance distribution of the illumination device 10, and FIG. 13 is an explanatory diagram showing an image and an illuminance histogram after improvement in the illuminance distribution of the illumination device 10. Here, H in FIG. 1 indicates the user.

The illumination device 10 includes a base part 20 that is placed on the desk D, a fixing clamp 25 for fixing this base part 20 to the desk D, an arm mechanism 30 whose base end side is attached to the base part 20 and that determines the position of a light source 62, and the head part 60 that is provided on the tip end side of this arm mechanism 30.

A control device 100 which will be discussed later is provided within the base part 20. A face camera (user camera) 21 that detects a specific region of the user H (e.g., position of the eyes) and the upper body posture of the user H and outputs a face image (user image) is provided on the near side of the base part 20. Also, a mode switch 22 is provided on an upper surface of the base part 20.

The arm mechanism 30 includes the arm part 40 and an arm operation part 50 that operates this arm part 40.

The arm part 40 includes a first arm 41 that is provided on a rotation shaft 23 built into the base part 20 and pivots in the directions of arrow a1 in FIG. 2, a second arm 42 that is provided so as to pivot freely about a horizontal axis on the tip end side of the first arm 41, an elevation angle adjustment member 43 that is provided so as to pivot freely about a horizontal axis on the tip end side of the second arm 42, a swinging member 44 that is provided so as to pivot freely on this elevation angle adjustment member 43, and a head attachment part 45 that is provided so as to pivot freely on this swinging member 44. The head part 60 is attached to the head attachment part 45.

The arm operation part 50 includes a first motor 51 that is built into the base part 20 and pivots the rotation shaft 23 in the directions of arrow $\alpha1$ in FIG. 2 and a first angle sensor 51$a$, a second motor 52 that pivots the first arm 41 in the directions of arrow $\alpha2$ in FIG. 2 and a second angle sensor 52$a$, a third motor 53 that pivots the second arm 42 in the directions of arrow $\alpha3$ in FIG. 2 and a third angle sensor 53$a$, a fourth motor 54 that pivots the elevation angle adjustment member 43 in the directions of arrow $\alpha4$ in FIG. 2 and a fourth angle sensor 54$a$, a fifth motor 55 that pivot the swinging member 44 in the directions of arrow $\alpha5$ in FIG. 2 and a fifth angle sensor 55$a$, and a sixth motor 56 that pivot the head attachment part 45 in the directions of arrow $\alpha6$ in FIG. 2 and a sixth angle sensor 56$a$.

The arm mechanism 30 variously controls the position and irradiation direction of the light source 62 which will be discussed later, by operating the arm operation part 50, and can move the light source 62 to an optimal light source position, for example.

The head part 60 includes a rectangular head base 61, the light source 62 that is provided on the lower surface of this head base 61 and is for lighting up the top of the desk D, desk cameras 63 and 64 that are provided on the light source 62 side and are configured to detect the illuminance distribution on the desktop and output desk images, and an illuminance sensor 65 that is provided on the upper surface of the head base 61 and is for detecting the environmental situation.

The control device 100 includes a control part 110 that cooperatively controls the various parts and controls the arm part 30, an image processing part 120 that is connected to this control part 110, a computation device (computation part) 130, and a warning part 140 that issues a warning to the user H with sound or light in the case where the distance between the eyes and the desk is less than or equal to a predetermined distance (threshold).

The output of the face camera 21 and the output of the desk cameras 63 and 64 are connected to the image processing part 120, which processes the face images obtained with the face camera 21 and the desk images obtained with the desk cameras 63 and 64, detects position data of a specific region of the user H (here, the eyes of the user H), and calculates the posture of the user H and a distance Q between the eyes of the user H and the desk D.

The computation device 130 calculates the optimal light source position of the light source 62 at which the shadow of the user H is minimized and the difference in illuminance on the desk D is minimized, by minimizing the dispersion of a histogram of the illuminance distribution on the desk D, based on the upper body posture of the user H.

The warning part 140 has a function of issuing a warning by sound or light when the distance Q between the eyes of the user H and the desk D falls below a reference value (predetermined value). Specifically, a warning sound from a speaker, flashing of the light source 62 or the like is used.

The illumination device 10 configured as described above is used as follows. The following four modes, for example, are provided in the illumination device 10; that is, a standby mode (M1), a calibration mode (M2), a light source position control mode (M3), and a close focusing mode (M4). These modes change sequentially, such as shown in FIG. 7, as a result of depressing the mode switch 22.

(M1) Standby Mode

The standby mode is a mode for performing standby processing of the illumination device 10. The illumination device 10 transitions to the standby mode after being powered on. When residing in the standby mode, operation of the arm mechanism 30 and lighting of the light source 62 are not performed.

(M2) Calibration Mode

The calibration mode is a mode for adjusting the face camera 21 and the desk cameras 63 and 64. Normally, the illumination device 10 transitions to the calibration mode once when powered on for the first time, but the calibration mode can be entered with an arbitrary operation. Adjustment of the face camera 21 and the desk cameras 63 and 64 involves performing image teaching of the face, upper body, eyes and hands of the user H, and calculation of a conversion factor from pixels to length using a dedicated pattern sheet.

(M3) Light Source Position Control Mode

The light source position control mode is a mode in which the position of the light source 62 of the illumination device 10 is controlled according to the posture of the user H and the environmental situation. The illumination device 10 selectively transitions to the light source position control mode through operation of the mode switch by the user H. A control method will be discussed later.

(M4) Close Focusing Mode

The close focusing mode is a mode in which the light of the illumination device 10 is controlled to always shine close in front of the user H. The illumination device 10 selectively transitions to the close focusing mode as a result of operation of the mode switch 22. When residing in the close focusing mode, the illumination device 10 recognizes the position of a hand of the user H with the desk cameras 63 and 64. The illumination device 10 controls the arm mechanism 30 such that the hand of the user H moves in the center of the images that are obtained from the desk cameras 63 and 64. The area around the hand of the user H will thereby be lit up.

As a result of these four modes being provided, the operational modes (M1) to (M4) are selected using the mode switch 22, after the processing is started by the illumination device 10 being powered on, as shown in FIG. 6 (ST10). The selected operational modes (M1) to (M4) are executed (ST11), and the processing ends as a result of the illumination device 10 being powered off.

More specifically, the operational modes (M1) to (M4) change every time the mode switch 22 is depressed. FIG. 7 shows this operation flow. That is, after the processing is started, it is determined whether the mode switch 22 has been depressed (ST20). When the mode switch 22 has not been depressed, the standby mode (M1) is continued (ST21). When the mode switch 22 has been depressed, it is determined whether calibration has been completed (ST30), and if completed, the processing proceeds to ST40.

If calibration has not been completed, the calibration mode (M2) is executed (ST31), and it is determined whether calibration has been executed normally (ST32), and if completed normally, the processing proceeds to ST40. Also, if calibration has not been completed, the processing returns to ST31.

At ST40, the light source position control mode (M3) is entered, and it is determined whether the mode switch 22 has been depressed (ST41), with the light source position control mode (M3) being continued until the mode switch 22 is depressed. In the case where the mode switch 22 has been depressed, the processing proceeds to the close focusing mode (M4) (ST50).

Then, it is determined whether the mode switch 22 has been depressed (ST51), with the close focusing mode (M4) being continued until the mode switch 22 is depressed. In the case where the mode switch 22 is depressed, the processing ends.

Next, the light source position control mode will be described in detail. When the illumination device 10 transitions to the light source position control mode, an image of the user H is acquired by the face camera 21. The image processing part 120 of the illumination device 10 has an image discrimination function that is realized by software created using the AdaBoost algorithm and Haarlike features derived from numerous images of the eyes in advance. A large amount of data such as human postures and hand shapes are also input, and image discrimination is performed. The position of the eyes in the image is derived by applying the acquired image in the image processing part 120.

The position coordinates of the eyes are given as Ex and Ey. Also, the position of the face camera 21 is set such that the lowermost part of an image that can be acquired will be equal in height to the upper surface part of the desk D, and thus the lowermost part of the image can be taken as the position of the desk D. Hence, the height of the position of the eyes detected as aforementioned is directly employed as the distance between the eyes and the desk D. Therefore, posture is assumed to have deteriorated when the following equation is satisfied.

$$Ey < Eth \qquad (1)$$

Here, Eth is a posture deterioration warning threshold.

When it is detected with the computation device 130 that the posture of the user H has deteriorated, the illumination device 10 issues a warning to the user H with sound, light or the like using the warning part 140.

The relationship between Ex and Ey when the face camera 21 recognizes the position coordinates of the eyes of the user H is shown in FIGS. 8 and 9. The position coordinates of the eyes are represented with (Ex, Ey). Also, the posture deterioration warning threshold Eth is set to 300. As shown in FIG. 8, in the case where the posture of the user H is normal, the position coordinates (Ex, Ey) of the eyes that are obtained by image processing will be (310, 400). The distance between the eyes and the desk will thereby be 400, which exceeds the threshold, and thus a warning is not issued.

On the other hand, in the case where the posture of the user H deteriorates, as shown in FIG. 9, the distance between the eyes and the desk will be 260 when the position coordinates (Ex, Ey) of the eyes obtained by image processing are (90, 260), and thus a warning is issued because the threshold is not reached.

Next, the process until when the illumination device 10 performs movement control to a light source position at which illuminance unevenness decreases, based on the current illumination situation observed using the illuminance sensor 65, will be shown.

FIG. 10 shows an illuminance distribution detection principle. That is, the illuminance distribution of the use environment is measured and an estimated illuminance distribution that is detected at a viewpoint position (Hi) of the user H is derived. An optimal position of the light source at which illuminance unevenness decreases is calculated, based on the estimated illuminance distribution.

The trajectory of motion of the tip end of the arm mechanism 30 is generated with the optimal position of the light source 62 as a target position, and the light source position is moved to the optimal position under trajectory tracking control.

The illumination device 10 measures an illuminance distribution Ia (i, j) in a plane of the desk D using the desk cameras 63 and 64. Then, an estimated illuminance distribution Ib at the viewpoint position of the user is derived based on the following equation.

$$Ib = R \times Xu \times Ia \qquad (2)$$

Here, R is a transformation matrix from an illuminance distribution coordinate system, Xu is the viewpoint space coordinates of the user H, and Ia is the illuminance distribution. Space coordinates $Xu = [x, y, z, \theta_r, \theta_p, \theta_y]$ of the viewpoint of the user H are acquired by detecting the position of the eyeball through image processing from images acquired from the face camera 21, and detecting the position in the depth direction from depth data.

A light source position with little illuminance unevenness is derived using this estimated illuminance distribution Ib. An illumination model Im of the illumination device 10 is used for this purpose. The illumination model Im is generated from the viewpoint of how the illuminance distribution at the current viewpoint position of the user is affected. An illuminance distribution that takes this illumination model into consideration and is ultimately provided to the user will be referred to as a "model-based illuminance distribution", and represented as Ic. The relationship between the estimated illuminance distribution Ib, the illumination model Im and the model-based illuminance distribution Ic is given by the following equation.

$$Ic = Ib \cdot Im \quad (3)$$

Also, the illumination model Im (x, y, z) is given by the following equation.

$$Im = SXKL + CX \quad (4)$$

Here, S is a coordinate transformation matrix from the light source to the user viewpoint position, X is the light source position coordinates, K is a model correction coefficient matrix, L is the illumination intensity distribution on the desktop surface, and C is a correction term.

In this technique, the light source position with little illuminance unevenness is considered to be where the model-based illuminance distribution is uniform at any position. That is, the light source position with little illuminance unevenness will be a position that results in a sketch of a graph with high sharpness whose peak is a value obtained when a histogram H(n) (illuminance value versus frequency) of the model-based illuminance distribution is drawn. In order to derive this light source position, optimization of the light source position is performed using a gradient method. With regard to the histogram H(n), $$\min \sigma^2 = \frac{1}{m} \sum_{i=0}^{m-1} (h_a - h_i)^2 \quad (5)$$

s.t. $n \in Z$ is given as the evaluation function at this time.

Here, m is the number of illuminance data, ha is the average illuminance value, hi is the illuminance value, and Z is a set of illuminance data. The significance of this evaluation function lies in maximizing the spatial region having a specific illuminance in the illuminance distribution, by minimizing the dispersion of the histogram H(n).

FIG. 11 shows coordinate axes of the light source position of the illumination device 10. In the light source position control mode, a light source position with little illuminance unevenness ($x_c$, $y_c$, $z_c$, $\theta_{rc}$, $\theta_{pc}$, $\theta_{yc}$) is obtained by the abovementioned optimization calculation. The trajectory of motion of the head part 60 (arm tip end) is generated and tracking control thereof is performed, such that the light source position will be ($x_c$, $y_c$, $z_c$, $\theta_{rc}$, $\theta_{pc}$, $\theta_{yc}$). The light source 62 thereby moves to ($x_c$, $y_c$, $z_c$, $\theta_{rc}$, $\theta_{pc}$, $\theta_{yc}$). This enables an illumination environment on the desk D with little illuminance unevenness to be realized, by moving the light source 62 to an optimal light source position based on the current illumination situation observed by the illumination device 10. An illumination environment with little illuminance unevenness can also be realized by controlling not only the light source position but also the illuminance and color temperature of the light source 62 itself.

FIGS. 12 and 13 are explanatory diagrams of an image showing the improvement process of the illuminance distribution obtained as described above and a histogram of the illuminance distribution obtained by processing this image. That is, before improvement, a histogram of illuminance distribution such as the graph of FIG. 12 was obtained from images obtained by the desk cameras 63 and 64. The histogram is widely dispersed and there is unevenness of illuminance. The light source position coordinates at this time were (x, y, z, $\theta_r$, $\theta_p$, $\theta_y$)=(100, 200, 300, 0, 0, 0).

Next, an optimal light source position with no illuminance unevenness was calculated by the computation device 130, based on the abovementioned equation (5). As a result of the calculation, ($x_c$, $y_c$, $z_c$, $\theta_{rc}$, $\theta_{pc}$, $\theta_{yc}$)=(82, 98, 312, π/6, -π/12, 2π/12) was obtained, for example. The arm mechanism 30 was operated and moved, such that the light source 62 took this position. The illuminance distribution after the movement was as shown in FIG. 13, and is an ideal illuminance distribution that is brightest in a central part and gradually becomes darker toward the periphery.

The illumination device 10 according to the present embodiment as described above issues a warning in the case where the distance between the eyes of the user H and the desk D is less than or equal to a predetermined value, and maintains the distance between the eyes of the user H and the desk D so as to not come too close. Also, in the case where the illuminance distribution on the desk D is inappropriate, the light source 62 can be moved so that the illuminance distribution can be improved and the desktop can be lit up with appropriate illuminance. Worsening eyesight of the user H can thus be prevented.

Note that the present invention is not limited to the above embodiment. The specific region that is captured with the face camera is not limited to the eyes as long as the region enables the position of the eyes to be predicted, such as a region of the upper body other than eyes, like the position of the ears, for example. Various modifications can, of course, be implemented without departing from the gist of the invention.

LIST OF REFERENCE NUMERALS

10 Illumination device
20 Base part
21 Face camera (user camera)
30 Arm mechanism
40 Arm part
41 First arm
42 Second arm
43 Elevation angle adjustment member
44 Swinging member
45 Head attachment part
50 Arm operation part
51 First motor
51a First angle sensor
52 Second motor
52a Second angle sensor
53 Third motor
53a Third angle sensor
54 Fourth motor
54a Fourth angle sensor
55 Fifth motor
55a Fifth angle sensor
56 Sixth motor
56a Sixth angle sensor
61 Head base
62 Light source 63, 64 Desk camera
65 Illuminance sensor
100 Control device
110 Control part
120 Image processing part
16
130 Computational device
140 Warning part
H User
D Desk

The invention claimed is:

1. An illumination device comprising:
a light source for lighting up a desktop;
an arm mechanism incorporating a motor for moving a position of the light source;
a user camera that detects a user;
a desk camera that detects an illuminance distribution on the desktop;
an image processing part that calculates a posture of the user and a distance between a specific region of the user and the desk, based on a user image obtained with the user camera and a desk image obtained with the desk camera;
a computation part that calculates, based on the posture of the user derived with the image processing part and the illuminance distribution obtained with the desk camera, an optimal light source position of the light source at which dispersion of the illuminance distribution is minimized;
a warning part that generates a warning in a case where the distance is less than or equal to a predetermined value; and
an arm control part that operates the arm mechanism such that the light source moves to the optimal light source position.

2. The illumination device according to claim 1, comprising:
an illuminance sensor for detecting an environmental situation,
wherein the computation part calculates the optimal light source position of the light source at which dispersion of the illuminance distribution is minimized, based on the posture of the user derived with the image processing part, the illuminance distribution obtained with the desk camera, and a detection result of the illuminance sensor.

3. An illumination device comprising:
a light source for lighting up a desktop;
a user camera that detects a user;
an image processing part that calculates a distance between a specific region of the user and the desk, based on a user image obtained with the user camera; and
a warning part that generates a warning in a case where the distance is less than or equal to a predetermined value.

4. An illumination device comprising:
a light source for lighting up a desktop;
an arm mechanism incorporating a motor for moving a position of the light source;
a user camera that detects a user;
a desk camera that detects an illuminance distribution situation on the desktop;
an image processing part that calculates a posture of the user, based on a user image obtained with the user camera and a desk image obtained with the desk camera;
a computation part that calculates, based on the posture of the user derived with the image processing part and the illuminance distribution obtained with the desk camera, an optimal light source position of a light source at which dispersion of the illuminance distribution is minimized; and
an arm control part that operates the arm mechanism such that the light source moves to the optimal light source position.

5. The illumination device according to claim 4, comprising:
an illuminance sensor for detecting an environmental situation,
wherein the computation part calculates the optimal light source position of the light source at which dispersion of the illuminance distribution is minimized, based on the posture of the user derived with the image processing part, the illuminance distribution obtained with the desk camera, and a detection result of the illuminance sensor.

* * * * *